United States Patent
Seo et al.

(10) Patent No.: US 7,072,566 B2
(45) Date of Patent: Jul. 4, 2006

(54) ULTRASHORT-PULSE LASER-WORKING METHOD AND APPARATUS AND STRUCTURAL BODIES PRODUCED BY USING THE SAME

(75) Inventors: Manabu Seo, Tokyo (JP); Yasufumi Yamada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 217 days.

(21) Appl. No.: 10/867,681

(22) Filed: Jun. 16, 2004

(65) Prior Publication Data

US 2005/0018996 A1   Jan. 27, 2005

(30) Foreign Application Priority Data

Jun. 26, 2003   (JP) ............................. 2003-183498

(51) Int. Cl.
- B23K 26/00 (2006.01)
- B23B 26/04 (2006.01)
- G02B 6/00 (2006.01)

(52) U.S. Cl. .............. 385/147; 219/121.6; 219/121.61; 219/121.62

(58) Field of Classification Search ................ 385/147; 219/121.6, 121.61, 121.62
See application file for complete search history.

(56) References Cited

U.S. PATENT DOCUMENTS

| 6,864,457 B1 * | 3/2005 | Alexander et al. ..... 219/121.11 |
| 7,002,149 B1 * | 2/2006 | Shigekawa et al. ......... 250/307 |

FOREIGN PATENT DOCUMENTS

| JP | 5-57464 | 3/1993 |
| JP | 10-113782 | 5/1998 |
| JP | 11-221684 | 8/1999 |
| JP | 2002-324768 | 11/2002 |

* cited by examiner

Primary Examiner—Brian Healy
Assistant Examiner—Jerry Martin Blevins
(74) Attorney, Agent, or Firm—Oblon, Spivak, McClelland, Maier & Neustadt, P.C.

(57) ABSTRACT

A laser-working method is disclosed, which includes the steps of splitting a single pulse laser beam having a time width of not more than 500 picoseconds into plural pulse laser beams; subjecting said plural pulse laser beams to time delaying, and adjusting a working surface-irradiating shape, an intensity distribution and a working surface-irradiating position of each of the plural pulse laser beams; working a target object to be irradiated, while the respective working surface-irradiating shapes of said plural laser beams are partially or entirely spatially overlapped with each other or one another; and setting to a time interval of from a pulse width to 1 nanosecond a time period during which each of the pulse laser beams is irradiated.

37 Claims, 8 Drawing Sheets

ULTRASHORT-PULSE LASER-WORKING METHOD AND APPARATUS AND STRUCTURAL BODIES PRODUCED BY USING THE SAME

BACKGROUND OF THE INVENTION (1) Field of the Invention

The present invention relates to a method and an apparatus for directly working a material to be worked, with irradiating plural ultrashort-pulse laser beams. Particularly, the invention relates to a laser-working method and an apparatus for forming a two-dimensionally or three-dimensionally fine shape in a short time. The invention is directed to a method and apparatus for producing MEMS elements requiring high-precision parts needing fine shapes and master plates thereof as well as optical elements such as diffraction optical elements, holographic elements and photonic crystals and master plates thereof.

(2) Related Art Statement

JP-A 10-113782 and JP-A 5-57464 describe methods for working target objects through continuously irradiating plural short-pulse laser beams. They are aimed at preventing damages of a vicinity around a working site through irradiation with intense laser beams having a short time width. Further, JP-A 2002-324768 and JP-A 11-221684 describe a method for working a target object by continuously irradiating plural ultrashort-pulse laser beams.

Ordinary laser working is effected by utilizing thermal effects, while the ultrashort-pulse laser working can be effected in a non-thermal manner. Thus, the latter is known as a working method capable of reducing damages and an attached matter in the vicinity of the working site.

In the working method for directly removing a portion of the target part with the short-pulse laser beams, the worked shape is controlled in such a manner that a pattern is drawn by moving an irradiated position of the laser beams or the target object or a pattern is projected through a mask. In such a case, since the method in which the laser beams or the target object is to be moved takes a long time for working. Thus, the mask pattern-projecting method is superior from the standpoint of forming the pattern in a short time. The mask pattern-projecting working method is usually adapted for forming two-dimensional shapes, and can also work three-dimensional shape by using a gray scale mask. Further, there is available a method for working complicated two-dimensional shapes or three-dimensional shapes through irradiating laser beams at plural times.

However, the mask pattern-projecting working method has the following demerits that (1) a highly precious mask is required for forming a complicated shape and production of such a mask is difficult and costly, that (2) there is low flexibility in terms of worked shapes, and that (3) it is difficult to produce a complicated three-dimensional shape.

On the other hand, the working method with use of the gray scale mask has the following demerits that (1) the production of the mask is more difficult and costly as compared with the ordinary masks and that (2) the worked shape is influenced by the characteristics of the gray scale mask itself.

In order to solve the above problems, a working method in which the laser beams are irradiated at plural times, while the irradiating shape or the intensity distribution of the laser beams is being varied, may be considered. For, when plural interfering laser beams are simultaneously irradiated while being overlapped in space, interfering fringes appear to deteriorate a worked state. Therefore, working needs to be successively performed by successively irradiating plural laser beams. According to this method, however, working is influenced at a second irradiating time and thereafter by reflection resulting from changes in shape of a worked surface, scattering resulting from changes in working efficiency and roughening of the worked surface, and absorption and scattering of laser beam due to further roughening of the worked surface and matters scattered by working, such changes and laser beam absorption and scattering occurring by a first laser beam irradiation. As a result, a desired shape cannot be finely formed on the working surface.

Under these circumstances, the present invention solves the problems of the above conventional laser workings, and is to provide an ultrashort-pulse laser working method which can produce various fine shapes, particularly various fine three-dimensional shapes as well as a working apparatus performing the above working method and optical elements (structural bodies) produced by the above working method and apparatus.

The present invention is directed to a fundamental construction of the laser-working method, which comprising:

splitting a single pulse laser beam having a time width of not more than 500 picoseconds into plural pulse laser beams;

subjecting said plural pulse laser beams to time delaying, and adjusting a working surface-irradiating shape, an intensity distribution and a working surface-irradiating position of each of the plural pulse laser beams;

working a target object to be irradiated, while the respective working surface-irradiating shapes of said plural laser beams are partially or entirely spatially overlapped with each other or one another; and setting to a time interval of from a pulse width to 1 nanosecond a time period during which each of the pulse laser beams is irradiated.

In the direct working with the ultrashort pulse laser, the surface shape of the target object begins to change around a few or several nano seconds after beginning the irradiation of the laser beam. In view of this phenomenon, before the surface shape begins to be changed with a first laser beam all the remaining pulse beams are continuously and successively applied to the working surface of the target object. Consequently, the object can be worked reasonably with the plural laser beams without being influenced by the changes in the surface shape, particularly edges of worked portions. Further, since the plural laser beams are successively irradiated upon the working surface of the object, while the time interval of not less than the width of the pulse is set between two adjacent irradiations. Thus, the pulse laser beams do not applied for an overlapped time period, so that they do not mutually interfere with each other or one another. At that time, the worked result is equivalent to that obtained by summing respective irradiation intensity distributions of the plural pulse laser beams. Furthermore, the worked shape can be flexibly changed depending upon the kinds of selected laser beams by the working method in which working is effected by selecting and using some of the plural split pulse laser beams.

The following are preferred embodiment of the laser working method according to the present invention. Any combination of the following embodiments should be deemed to be preferred embodiments of the laser working method according to the present invention, unless contrary to the present invention.

(1) The intensity of at least one of the plural laser beams is adjustable.

By this, the object can be worked in a three-dimensional shape, while relative intensities of the plural pulse laser beams are changed.

(2) The laser beam is split by using a diffraction optical element.

When the laser beam is split by using the diffractive optical element, the number and the intensity distribution of the split laser beams can be changed in various manners depending upon the design of the diffractive optical element. Further, when the laser beam is split with the diffractive optical element, the ultrashort pulse laser beams can be irradiated upon the same location, while a very short time interval is being ensured among the irradiated beams.

(3) A polarization beam splitter is used as the splitting optical element.

By this construction, the laser beam can be split into two laser beams by passing the pulse laser beam through the polarization beam splitter. At that time, the relative intensities of the two split laser beams can be varied by adjusting the polarization direction of the incident laser beam. As compared with a method in which the laser beam is to be split by a half mirror, loss of the beam can be almost completely diminished by using the polarization beam splitter in case that the laser beam is split into two laser beams and they are coupled together.

(4) The laser beam is split into plural laser beams and the split laser beams are subjected to time-delaying by using a birefringent material as a splitting/delaying optical system.

When a pulse laser beam is inputted into the birefringent material such as calcite, an optical path changes depending upon a polarization direction. The laser beam can be split by utilizing this phenomenon. When the laser beam is split by this method, time delay occurs between two split laser beams. The delayed time can be varied by the thickness of the birefringent material.

(5) The pulse laser beam is split into plural laser beams spatially.

The laser beam ordinarily has a spatially non-uniform intensity distribution, which causes poor worked shapes. In order to solve the spatially non-uniform intensity distribution of the laser beam, a beam homogenizer is usually used to split the laser beam spatially and gather the split laser beams one upon another at the working surface. However, mutually interfering laser beams cause interference at a location where the beams are interposed together. As a result, a non-uniform intensity distribution is formed by the interference. According to the working method of the present invention where the plural pulse beams obtained by splitting the laser beam three-dimensionally are irradiated upon the working surface while time delays are given thereto, the above interference does not occur, so that the object can be worked with the laser beams having a three-dimensionally uniform intensity distribution.

(6) The worked shape is controlled by projecting at least one of the plural pulse laser beams in a reduced size through a mask.

By this, the worked shape can be controlled. Particularly, since the shapes of plural mask patterns can be worked so that the worked shapes may be overlapped at the working surface, fine working can be easily performed. Further, working can be performed at high flexibility in that a slightly different worked shape can be realized by changing any one of the plural masks, for example.

Further, when a stage for moving the mask is attached or when an element, such as a liquid crystal, which can control the spatial intensity distribution of the laser beam, the worked shape can be dynamically adjusted.

(7) The worked shape is controlled by modulating the intensity of at least one of the plural pulse laser beams by a spatial intensity modulator.

It is known that light of which intensity is spatially modulated (amplitude modulated) forms a Fourier transformed image of the modulated image at a light-condensed point. In this embodiment, the worked shape can be controlled by this principle. When the spatially intensity modulator such as a liquid crystal is used, the worked shape can be dynamically adjusted.

(8) The worked shape is controlled by modulating the spatial phase of at least one of the plural pulse laser beams.

Since there is an optical transparent portion in the method for obtaining the Fourier transformed image by modulating the amplitude, a energy loss occurs for the incident light. On the other hand, almost the entire incident light can be utilized for working, so that working can be performed at a high energy efficiency. The worked shape can be dynamically controlled by using the spatial phase modulator employing a liquid crystal.

(9) A material exhibiting transparency for the laser beams and a different refractory factor to air is used as a delaying optical system.

This material can finely modulate the delayed time simply and inexpensively.

(10) An electro-optic element is used as the delaying optical system.

According to this embodiment, the delayed time increases in proportion to the intensity of current by utilizing the primary electro-optic phenomenon, so that the delayed time can be finely adjusted with good reproducibility.

(11) A material exhibiting transparency to the laser beam is used as the object to be worked.

This embodiment can effectively cope with the production of high-need products such as transparent type optical elements by working the transparent material. Particularly when a step or curved surface exists at the surface of the transparent material, a problem that the laser beam is partially concentrated inside the transparent material to cause an internal defect can be prevented.

(12) A thin film or a laminated film unit is used as the object to be worked.

According to this embodiment, when the thin film is used as the object to be worked, the film or film unit can be uniformly worked in a depth direction irrespective of the intensity. Further, the worked shape can be controlled in a nanometer order in a depth direction by using the laminated film unit.

The laser-working apparatus according to the present invention comprises:

a splitter for splitting a single pulse laser beam having a time width of not more than 500 picoseconds into plural pulse laser beams;

a time-delayer for subjecting said plural pulse laser beams to time delaying;

a beam shape-rectifying optical system for adjusting a working surface-irradiating shape, an intensity distribution and a working surface-irradiating position of each of the plural pulse laser beams; and a beam-propagating optical system, wherein a target object to be irradiated is worked with the plural laser beams, while the respective working surface-irradiating shapes of said plural laser beams are partially or entirely spatially overlapped with each other or one another, and a time period during which each of the pulse laser beams is irradiateirradiatedd on a working surface of the object is set to a time interval of from a width of a pulse to nanosecond.

The present invention is also directed to an optical element produced by the laser working method or the laser working apparatus according to the present invention.

BRIEF DESCRIPTION OF THE DRAWINGS

For a better understanding of the invention, reference is made to the drawings, wherein.

DETAILED DESCRIPTION OF THE INVENTION

Examples of the laser working method of the present invention, examples of beam splitting and time delaying, embodiments of the laser working apparatus of the invention and examples of structural bodies produced by the laser working apparatus will be explained in more detail.

EXAMPLE 1

Figure 1:
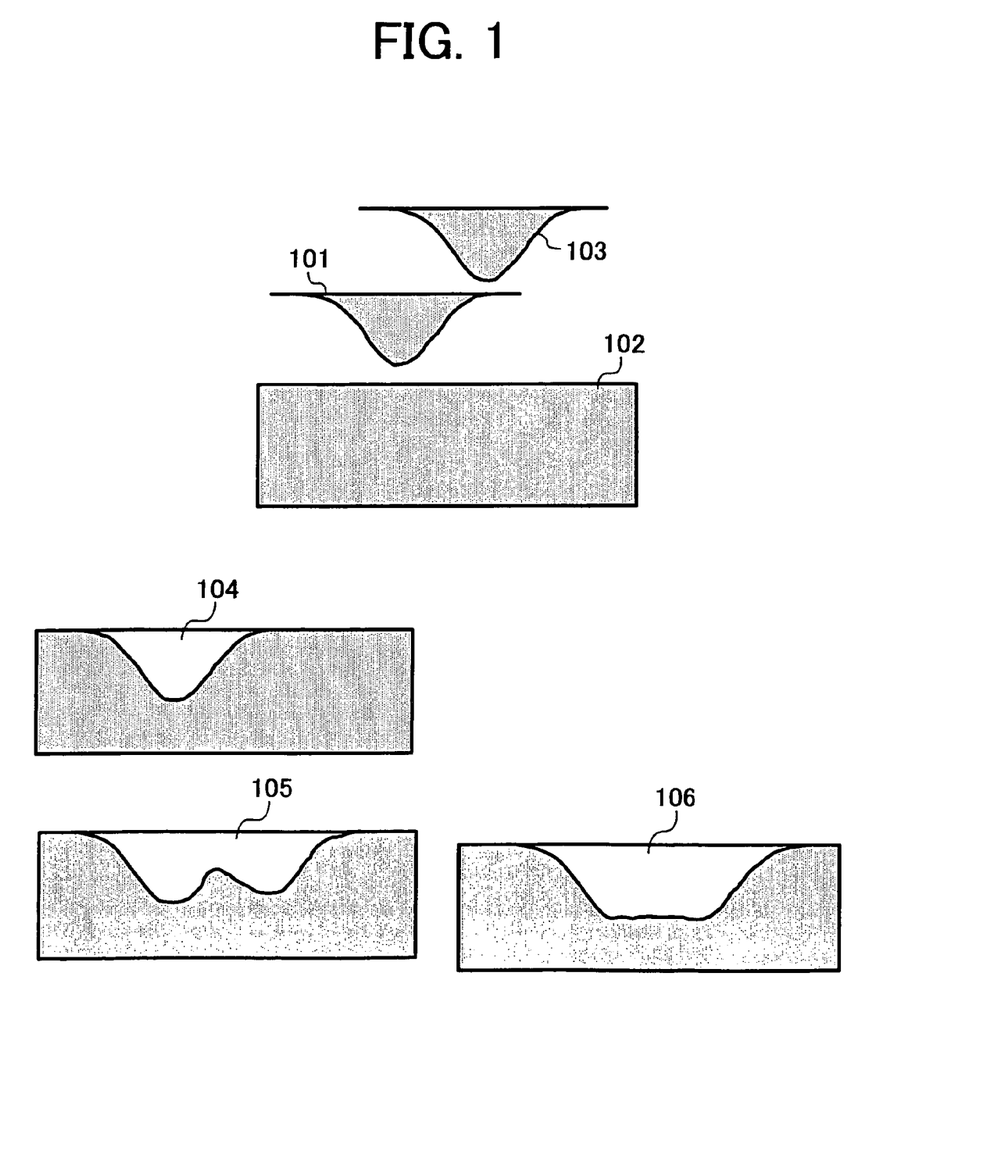
FIG. 1 is a view illustrating a fundamental principle of the laser working method according to the present invention.

An example of the laser working method of the present invention will be explained with reference to FIG. 1.

Figure 2A:
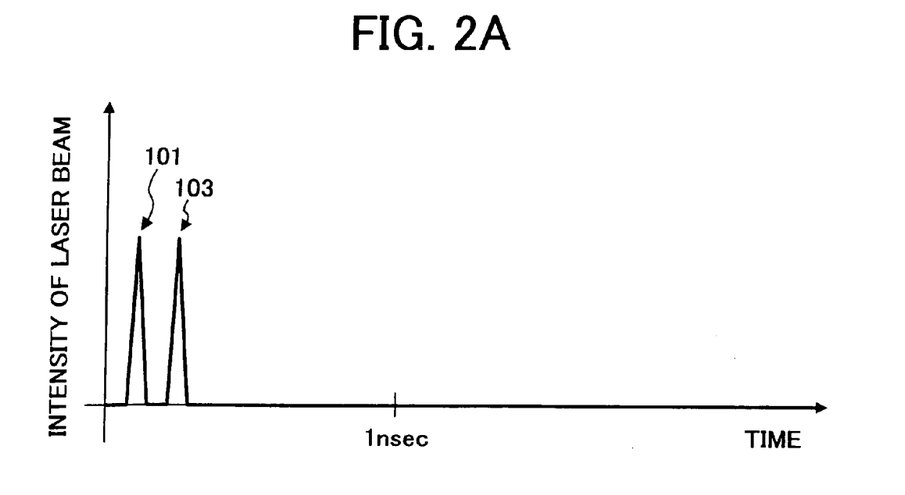
FIG. 2A and FIG. 2B are a graph showing relationship between time and intensity of laser beam and a graph showing relationship between time and configuration-changed amount, respectively.
Figure 2B:
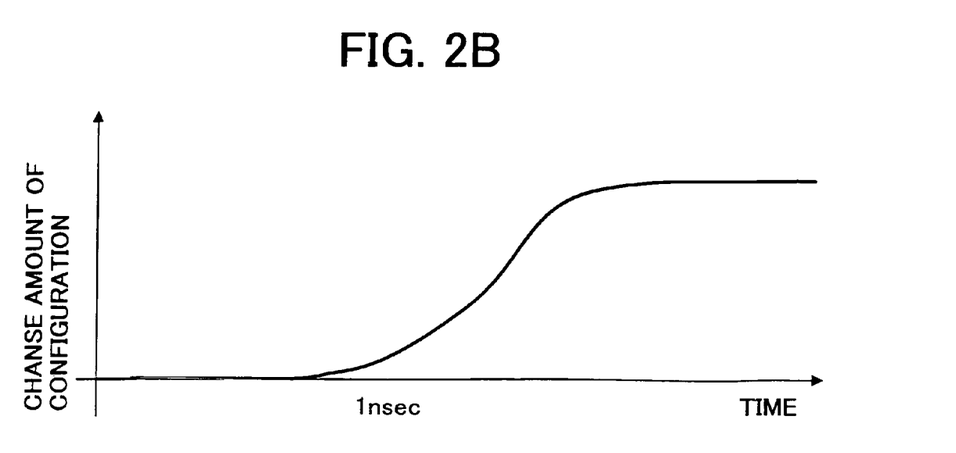

A first pulse laser beam 101 having a pulse time width of 100 fs is applied to an object 102 to be worked, and then a second pulse laser beam 103 having the same pulse time width of 100 fs is applied to the object. The worked shape with the first pulse laser beam is as indicated by 104. When the second pulse laser beam is applied after the termination of the working with the first pulse laser beam (that is, a few or several nanoseconds or more thereafter), the worked shape is as indicated by 105 in which a working efficiency decreases at an inclined surface formed with the first pulse laser beam. According to an example of the present invention, a worked shape is as indicated by 106 when the second pulse laser beam is applied 200 fs after the first pulse laser beam is applied. At that time, the intensity of the pulse laser beams applied to the working surface of the object and the change amount of the working shape vary with the lapse of time as shown in FIGS. 2A and 2B, respectively.

In the laser working method of Example 1, a single ultrashort pulse laser beam having a pulse time width of not more than 500 picoseconds is prepared, and is split into plural ultrashort pulse laser beams. The split pulse laser beams are subjected to time delaying, their shapes are rectified so that a desired shape and intensity distribution may be attained at the working surface, and then the beams are successively irradiated upon the working surface of the object (Preferred examples of the splitting and the time delays will be mentioned later). At that time, the irradiating time period of each of the pulse laser beams is a few femtoseconds to hundred picoseconds. It is preferable that a time period from application of the first pulse laser beam to the termination of irradiation with the final pulse laser beam it not more than 1 nanoseconds. Further, the object may be worked by selected some of the split pulse laser beams. It is also preferable that a delaying optical system is provided for each of the split pulse laser beams (It is generally known in direct working with a ultrashort pulse laser beam that the surface shape of the object to be worked changes around a few nanoseconds after the laser beam begins to be irradiated thereupon. This phenomenon is described in detail in Proc. SPIE4274, 78–87).

When all the remaining pulse beams are applied to the object before the surface shape of the object changes with the first pulse laser beam, the object can be worked with the plural laser beams by utilizing this phenomenon without being influenced by changes in the surface shape, particularly edges of worked portions. Further, since the pulse laser beams are successively applied to the object at the time interval of not less than the pulse width, the beams do not overlap together in terms of time and cause no interference therebetween. At that time, the worked result is the same as in the case of working with the single pulse which would be equal to the sum of the irradiation intensity distribution of the plural pulse laser beams. Further, in the case of the working method in which some of the plural split pulse laser beams are selected and used for working, the worked shape can be varied flexibly depending upon the kinds of the laser beams selected. Superfine working can be performed by a technique that the intensities of the first and second pulse laser beams are set at not more than a threshold value, and working is performed with only an overlapping portion of the first and second laser beams.

The above-recited publications (JP-A 2002-324768 and JP-A 11-221684) describe a method in which the object is worked by continuously irradiating plural short pulse laser beams. These publications prevent damages in the vicinity of the portion worked by irradiating the strong laser beam having a short time width. The above publications describe the method for working the object by irradiating plural ultrashort pulse laser beams. These publications relate to the working method in which the working efficiency is enhanced by irradiating the plural ultrashort pulse laser beams at the same place on the working surface. Therefore, these prior art techniques differ from the working method according to the present invention in which the worked result is obtained by the intensity distribution obtained by adding those of the respective pulse laser beams, while the respective pulse laser beams do not influence upon each other or one another (influence upon the changes in the worked shape, influence upon interference).

EXAMPLE 2

In Example 2, the intensity of at least one of the above plural pulse laser beams is adjusted with an ND filter or a polarization element. A device is preferably provided for adjusting the intensity of each of the laser beams so that their relative intensities may be freely varied. In the following, Example 2 will be explained with reference to FIG. 3.

Figure 3:
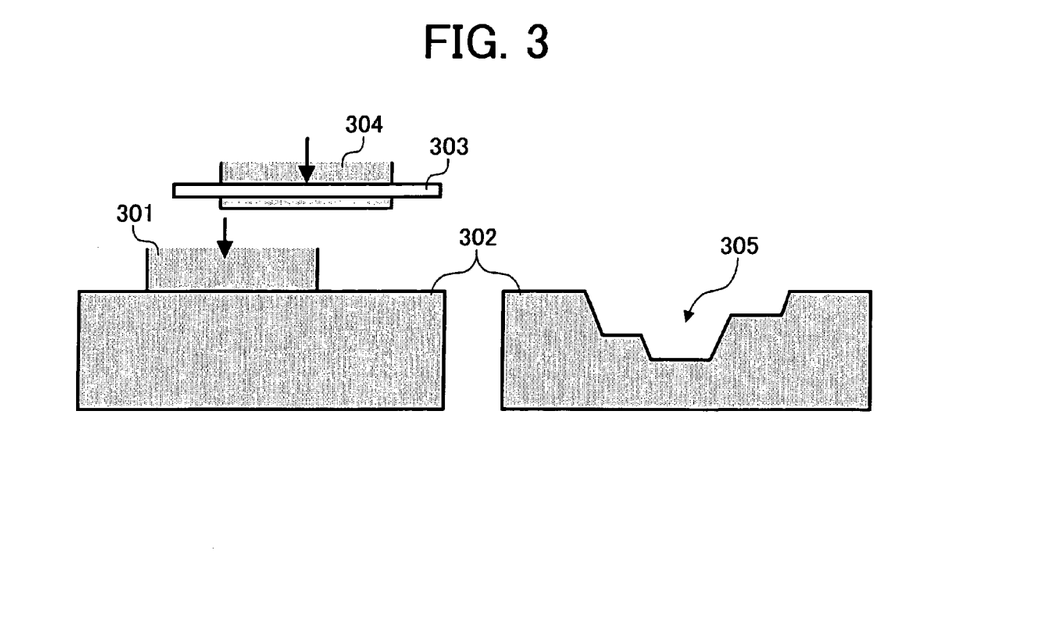
FIG. 3 illustrates a worked shape of an object when intensity is varied between a first pulse laser beam and a second pulse laser beam.

First, a first pulse laser beam 301 having a pulse time width of 100 fs is applied to an object 302 to be worked. Then, a second pulse laser beam 304 of which intensity is adjusted to a half of that of the first pulse laser beam through the ND filter 303 is applied to the object 200 fs after the application of the first pulse laser beam. A worked shape having a three-dimensional step 305 can be obtained after the termination of working.

According to this Example, the three-dimensional worked shape can be realized by working, while the relative intensities of the plural pulse laser beams are varied.

EXAMPLE 3

In Example 3, a diffractive optical element is used for splitting a pulse laser beam. This will be explained with reference to FIG. 4.

Figure 4:
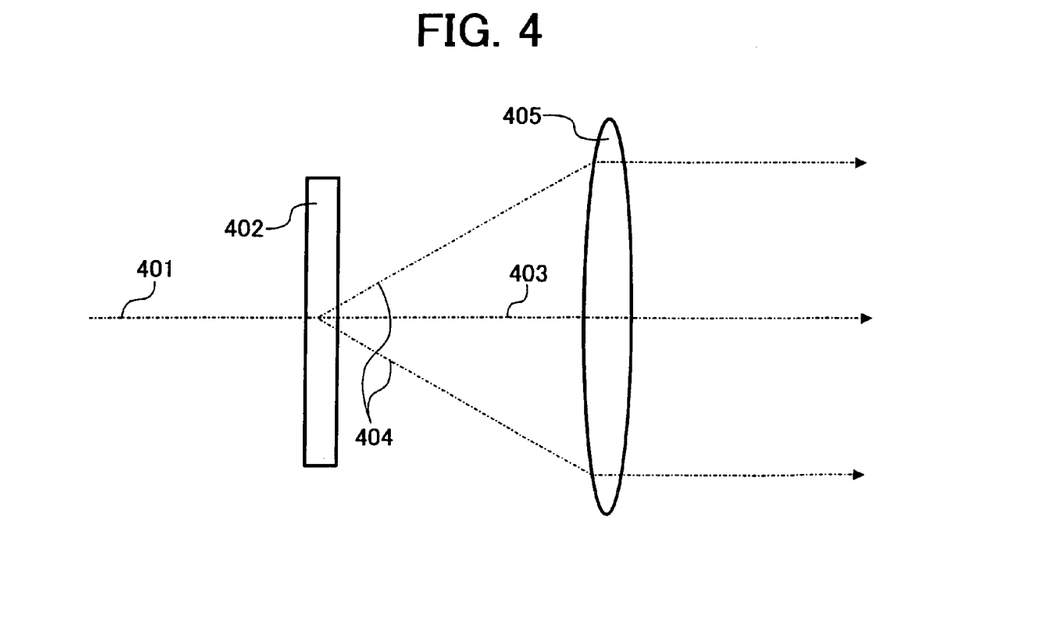
FIG. 4 is a structural view for splitting a beam with use of a polarization optical element.

A single pulse laser beam 401 is split into non-diffracted light beam 403 and plural primary diffracted light beams 404 by a diffractive optical element 402. At this time, the intensity ratio off the non-diffracted light beam 403 and plural primary diffracted light beams 404 is variable by appropriately designing the structure of the diffraction optical element 402. When a collimator lens 405 is installed downstream the beam splitting, the beams can be converted to plural parallel pulse beams. In this case, there is no time delay between the plural primary diffracted light beams 404, whereas there is a time delay between the non-diffracted light beam and plural primary diffracted light beams.

According to Example 3, the number and the intensity distribution of the split laser beams can be varied in various ways depending upon the design of the diffraction optical element used as a laser splitting means. Further, the ultrashort pulse laser beams can be irradiated upon the same position in a very short time difference according to the laser splitting method with the diffraction optical element. JP-A 2003-25085 proposes a interference working method with plural ultrashort pulse laser beams by utilizing the above feature.

EXAMPLE 4

In Example 4, a polarization beam splitter is used for splitting a pulse laser beam. Since a working surface of an object is influenced by a polarizing direction of the working laser beam, an optical element is preferably provided for adjusting the polarizing direction at the time of final working.

Figure 5:
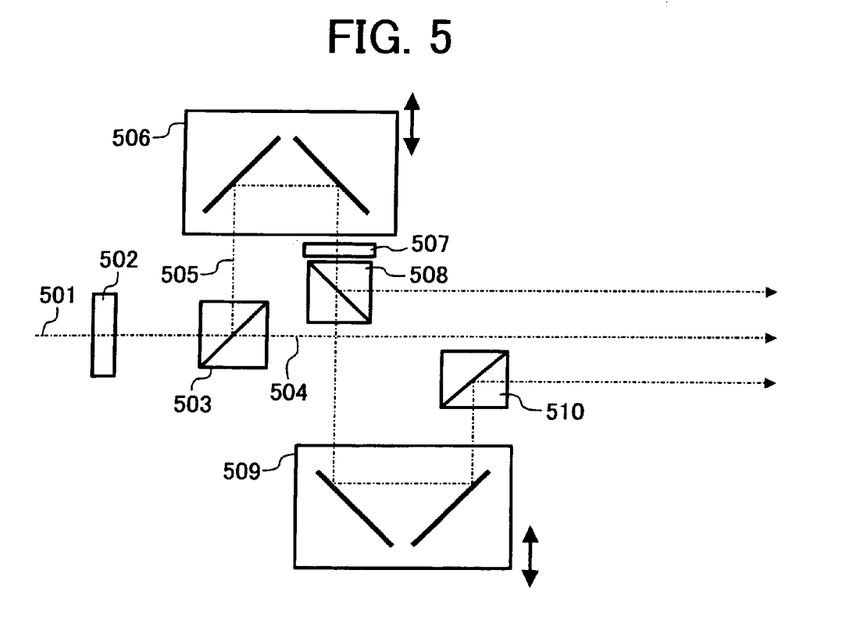
FIG. 5 is a schematic view of a polarization beam splitter used for forming three pulse laser beams.

In the following, an example of splitting a pulse laser beam according to the laser working of the present invention will be explained with reference to FIG. 5.

After a polarizing direction of a single pulse laser beam 501 is adjusted by a ½ wavelength plate 502, and the laser beam is split into two beams 504 and 505 by a polarization beam splitter 503. The reflected beam 505 is returned by two mirrors 506, while an optical path difference is given thereto, and the polarization direction of the beam is adjusted again by a ½ wavelength plate 507. Thereafter, the beam 505 is divided into two beams again by a polarization beam splitter 508. One of two beams is combined with the beam 504, while the other is combined with the beam 504 by the polarization beam splitter 510 after an optical path difference is given thereto again by two mirrors 509.

The pulse laser beam can be split into two beams by inputting the beam into the polarization beam splitter. The relative intensities of two split laser beams can be adjusted by adjusting the polarization direction of the incident laser beam. As compared with the method for splitting the beam with a half mirror, the use of the polarization beam splitter can almost eliminate the loss of the light amount when the laser is split into the beams and they are combined again.

When the pulse laser beam is split into the beams and the polarization direction of one of the split beam is changed by inserting the wavelength plate such as the ½ wavelength plate or ¼ wavelength plate, a greater number of split beams can be obtained, while the intensity thereof is adjusted.

EXAMPLE 5

In Example 5, a birefringent material is used for splitting a pulse laser beam. In the following, an example of pulse beam splitting and time delaying in the laser working method of the present invention will be explained with reference to FIG. 6.

Figure 6:
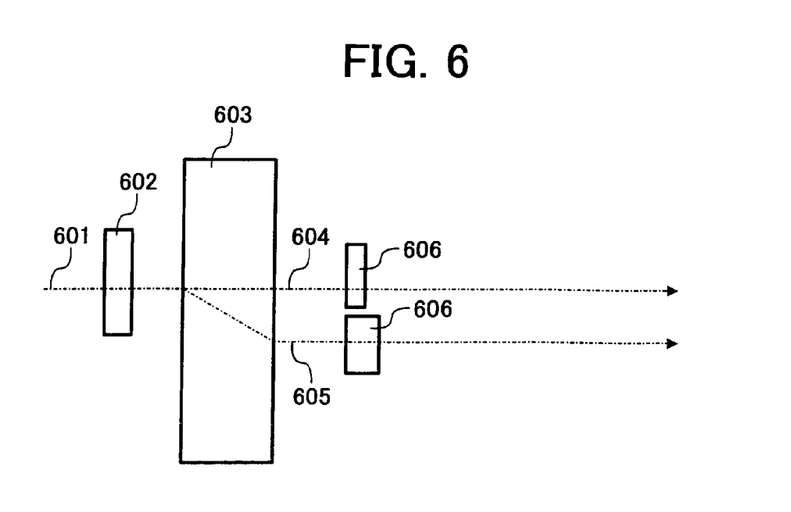
FIG. 6 is a view for schematically illustrating a beam-splitting system with use of a birefringent material.

The polarization direction of a single pulse laser beam 601 is adjusted through a ½ wavelength plate 602, the beam is inputted to a birefringent material 603, and is split into an ordinary light beam 604 and an extraordinary light beam 605. An optical path length of each of the pulse laser beam is adjusted by a glass 606.

The optical path changes depending upon the polarization direction, when the pulse laser beam is inputted to the birefringent material such as calcite. The beam can be split by using this phenomenon. When the beam is split according to this method, a time delay occurs between two beams. The time delay can be varied depending upon the thickness of the birefringent material.

EXAMPLE 6

In Example 6, plural pulse laser beams are formed by dividing and splitting a single pulse laser beam spatially. Example 6 will be explained with reference to FIG. 7.

Figure 7:
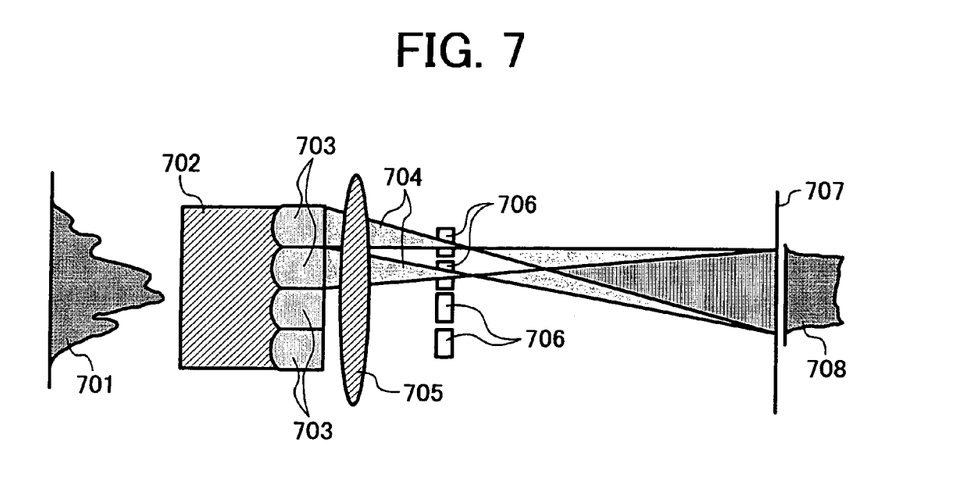
FIG. 7 is a schematic view of a beam homogenizer in which an interfering effect is removed by affording time delays to spatially split laser beams.

Split beams 704 are formed by inputting a single pulse laser beam 702 having a spatial beam intensity distribution 701 into a cylindrical lens array 703. The split beams pass a collimator lens 705, and combined together at an image-forming surface 707 after a delayed time is adjusted with an array 706 of parallel plane glasses 706 of which thicknesses differ depending upon locations. At that time, the time average intensity distribution of the beams on the image-forming surface 707 is a uniform beam profile file 708. When working is effected on the surface 707 or the plane 707 is projected onto a surface to be worked, the working can be done at a spatially uniform intensity.

The laser beam ordinarily has a non-uniform spatial intensity distribution three-dimensionally, which results in a deteriorated worked shape. In order to solve the non-uniform spatial intensity distribution of the laser beam, a beam homogenizer is used to split the laser beam spatially and interpose the split laser beams one upon another at the working surface. However, mutually interfering laser beams cause interference at a location where the beams are interposed together. As a result, a non-uniform intensity distribution is formed by the interference. According to the working method of the present invention where the plural pulse beams obtained by splitting the laser beam spatially are irradiated upon the working surface while being time-delayed, the above interference does not occur, so that the object can be worked with the laser beams having a spatially uniform intensity distribution.

EXAMPLE 7

In Example 7, the worked shape is controlled by projecting at least one of the above plural pulse laser beams through a mask in a reduced size. This will be explained with reference to FIG. 8.

Figure 8:
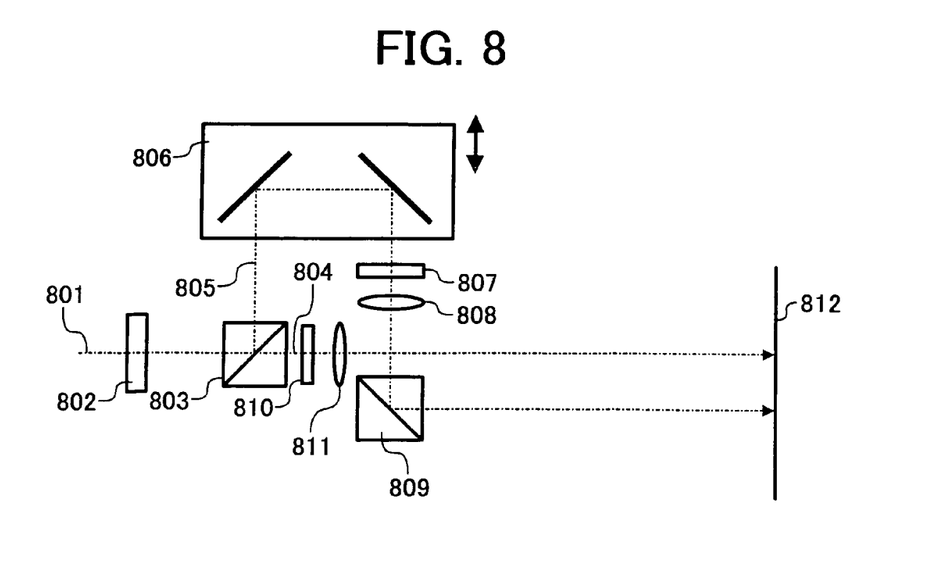
FIG. 8 is a view for schematically illustrating a working method with a mask projection for two pulse beams split with a polarization beam splitter.

After the polarization direction of a single pulse laser beam 801 is adjusted through a ½ wavelength plate 802, the beam is split into two beams 804 and 805 by a polarization beam splitter 803. The reflected beam 805 is returned by two mirrors 806, while an optical path difference is given, and is inputted into a polarization beam splitter 809 through a mask 807 and a lens 808. Similarly, the beam 804 passes a mask 810 and a lens 811, and combined with the beam 805 by the polarization beam splitter. By this, a shape is obtained by interposing the shape of the mask 807 with that of the mask 810 at a working surface 812.

In Example 7, the worked shape can be controlled. Particularly, since the shapes of the plural mask patterns can be worked to form the interposed shape at the working surface, working can be made in a fine shape. When any one of the plural masks is varied, for example, working can be made at high flexibility such that a slightly varied shape can be worked. Further, when a stage is provided to move the mask or an element, such as a liquid crystal, capable of controlling the spatial intensity distribution of the laser beam is used as a mask, the worked shape can be dynamically adjusted.

EXAMPLE 8

In Example 8, at least one of plural pulse laser beams formed by splitting an interferable pulse laser beam is passed through a mask or its amplitude (intensity) is spatially modulated, and then the beams are condensed on a working surface with a condensing optical element such as an objective lens. Each of the laser beams needs to be interfering.

In the following, other example of the laser working method according to the present invention will be explained with reference to FIG. 9.

Figure 9A:
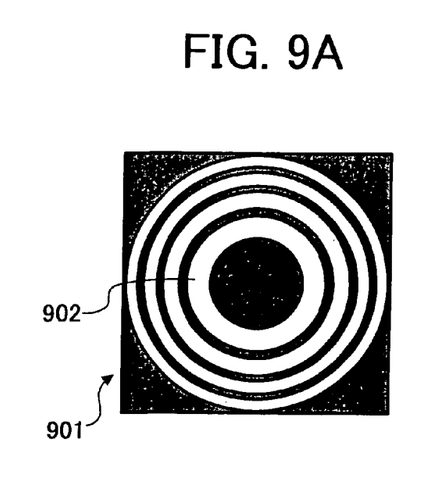
FIGS. 9A and 9B show an aperture mask and an image formed on a light-condensing surface with the aperture mask, respectively.
Figure 9B:
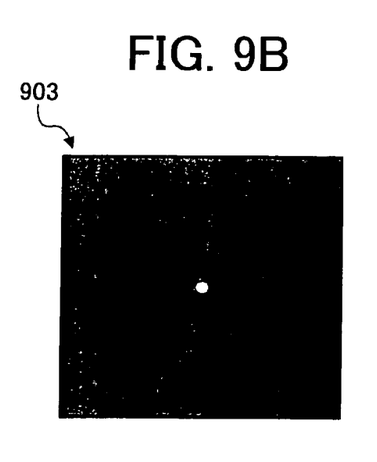

FIG. 9A shows a mask shape 901 in which a portion 902 (white portion) is an aperture. A laser beam having passed a mask 901 is condensed by a lens (not shown), and forms a working shape 903 at a condensing surface (FIG. 9B).

It is known that light of which amplitude is spatially modulated forms a Fourier transformed image of the modulated light at a light-condensed point. In this embodiment, the worked shape can be controlled by this principle. Although the pulse laser beam of which amplitude is modulated is interferable, the laser beam and the other pulse laser beam(s) do not exhibit interference because there is a time delay of not less than a time pulse width between them. When the spatially phase modulator employing a liquid crystal is used, the worked shape can be dynamically adjusted.

EXAMPLE 9

The phase of at least one of pulse laser beams obtained by splitting a coherent pulse laser beam is spatially modulated by a permeable type or reflection type phase-modulating element, and the beams are condensed on a working surface by a condensing optical element such as an objective lens. Each of the pulse laser beams needs to be interferable.

Figure 10A:
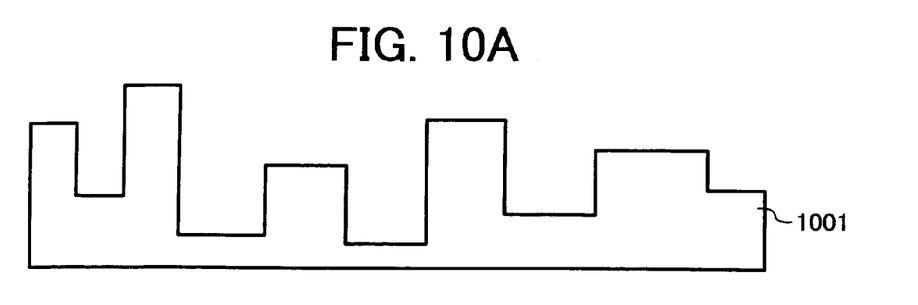
FIGS. 10A and 10B are schematic views of spatial phase modulators, respectively.
Figure 10B:
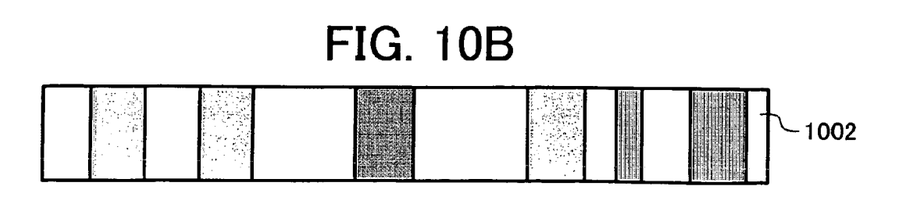

Examples of permeable type spatial phase modulating elements are shown in FIG. 10A and 10B, respectively. An element 1001 is a spatial phase modulating element produced by transparent bodies having different refractory factors to air. The phase difference is controlled by the uneven surface of the element 1001. An element 1002 is a spatial phase modulating element having spatially varied refractive factors in which phase difference is controlled depending upon varied refractive factors.

Since a light non-transmitting portion exists in the method for obtaining a Fourier transformed image by modulating the amplitude, an energy loss occurs in an incident light. In the phase modulating type of this Example, almost all the incident light can be used for working, so that working can be done at high energy efficiency. When a spatial phase modulator employing a liquid crystal is used, the worked shape can be dynamically controlled.

EXAMPLE 10

In Example 10, split pulse laser beams are time-delayed by interposing a material having a different refractive factor, such as a glass in an optical path. This will be explained with reference to FIG. 11.

Figure 11:
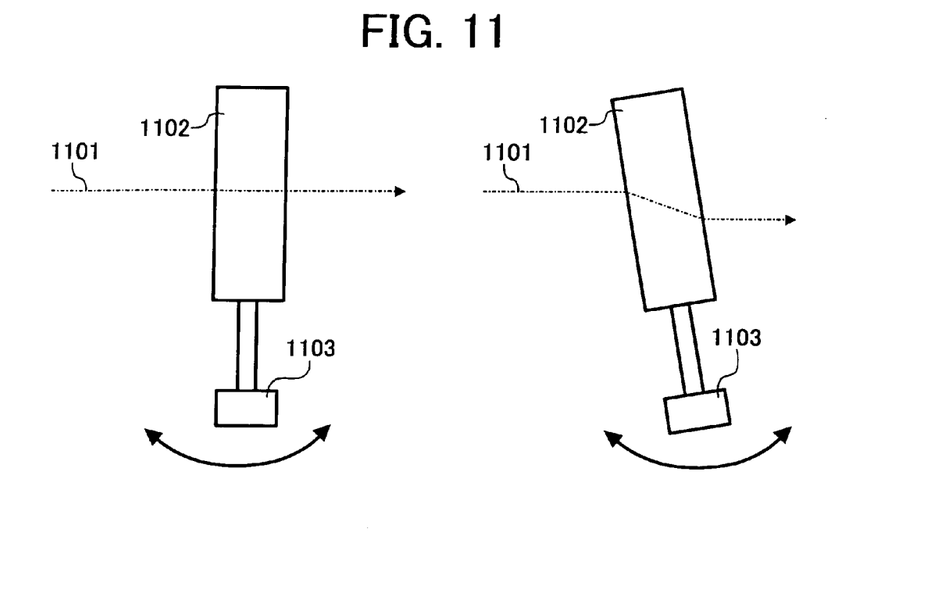
FIG. 11 is a view of illustrating fine modulation of the delayed time by adjusting the angle of a glass plate.

A pulse laser beam 1101 passes a glass plate 1102. To the glass plate 1102 is attached a stage 1103 which turns in arrow directions as shown. An optical path length is finely adjusted by turning the glass plate. A parallel flat substrate is formed by optically polishing opposite surfaces of the material, and a reflection-preventing coating is preferably applied thereto. According to this example, the delayed time can be finely adjusted by the simple and inexpensive device.

At that time, different time delays can be realized by simultaneously using plural materials having different refractive factors, such as BK7 glass and quartz.

EXAMPLE 11

In Example 11, at least one of plural pulse laser beams is passed through an electro-optic element such as LiNbO3, for example, and a voltage to be applied to the electro-optic element is adjusted, so that a delayed time between the pulse laser beams is adjusted.

According to this Example, since delayed time becomes larger in proportion to the intensity of current by utilizing the primary electro-optic phenomenon, the delayed time can be finely adjusted at high reproducibility.

EXAMPLE 12

There is high demand in working transparent bodies to produce transmission type optical elements.

In Example 12, materials transparent to laser beam, particularly materials such as glass, quartz and polymers generally used as transmission type optical elements are used as objects to be worked.

When a portion of a surface of a transparent body where a step or a curved surface exists is irradiated and worked with laser beam, the laser beam is partially condensed inside the transparent body to cause an internal defect. Therefore, when a complicated shape is formed for the transparent body by working at plural times, working is preferably made by the method as described in any one of Examples 1 to 11.

EXAMPLE 13

In Example 13, a thin film of an absorbent or a thin film-laminated structural body in which thin transparent and absorbent films are laminated one upon another is used as an object to be worked.

If the thin film is used in this Example, it can be constantly worked in a depth direction irrespective of strength. Further, working can be controlled in the depth direction in an order of nanometer by using the laminated film body.

EXAMPLE 14

Example 14 is directed to a laser working apparatus including a short pulse laser beam source and optical elements such as lenses, mirrors, etc. for generating a single ultrashort pulse beam to work an object with a laser with use of the method in any one Examples 1 to 13. The working apparatus is preferably equipped with a stage capable of moving the object in a direction orthogonal or parallel to the optical axis. The laser working apparatus in Example 14 can practice the laser working in any of Examples 1 to 13.

Figure 12:
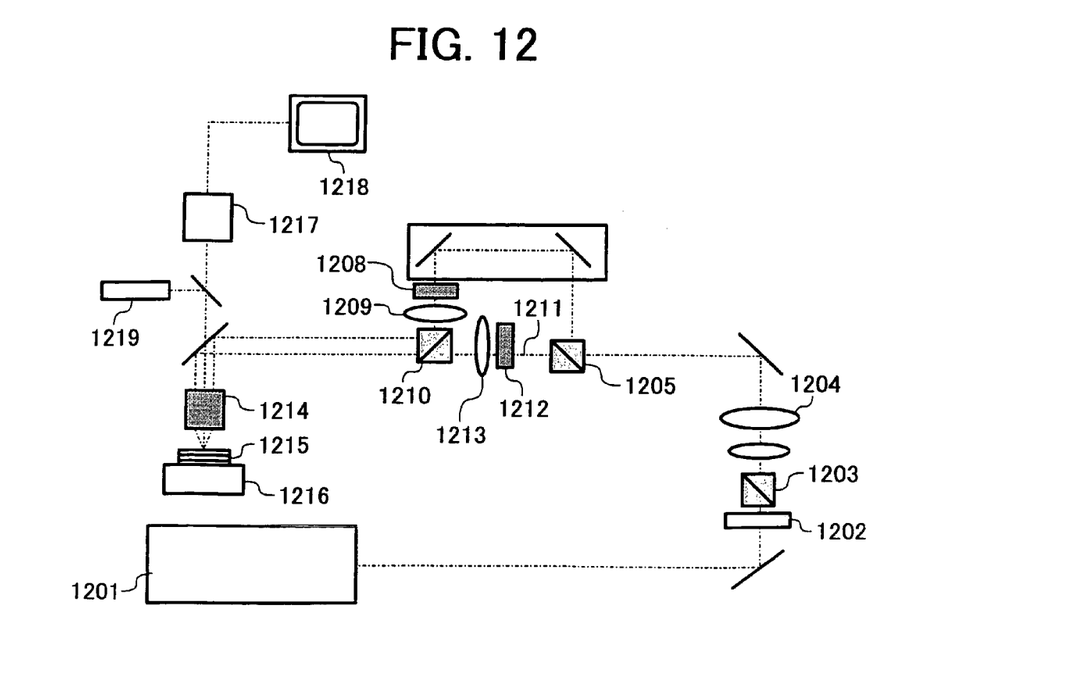
FIG. 12 is an embodiment of a laser working apparatus according to the present invention.

In the following, the laser working apparatus in Example 14 will be explained with reference to FIG. 12.

In the apparatus of Example 14, a Ti:Sapphire laser 1201 having a pulse width of 120 fs is used as a laser beam source, and the emitted beam is passed through a λ/2 wavelength plate 1202 and a polarization beam splitter 1203, thereby adjusting an intensity and polarization thereof. The resulting beam is passed through a wave shape-rectifying lens 1204, and is split into two beams with a polarization beam splitter 1205. After an optical path length of a second pulse laser beam 1206 is adjusted by a retroreflector 1207 and the beam is then reflected, it is led to a polarization beam splitter 1210 through a mask 1208 and a lens 1209.

Similarly, a first pulse laser beam 1211 is inputted to the polarization beam splitter through a mask 1212 and a lens 1213. At that time, the retroreflector 1207 adjusts the optical path length such that a delayed time between the first pulse laser beam and the second pulse laser beam is around 200 fs.

Then, the combined beam is condensed on a surface of an object 1215 to be worked, by an objective lens 1214. The object 1215 is movable in a direction orthogonal to the optical axis by a stage 1216. The object can be worked, while its worked shape is being observed with a monitor 1218 through a CCD 1217.

EXAMPLE 15

Example 15 is an example of a structural body produced by the laser working apparatus in Example 14. The structural body has a typical worked size that a worked width is submicrons to several hundreds microns and a worked depth is a few nm to several microns.

Figure 13A:
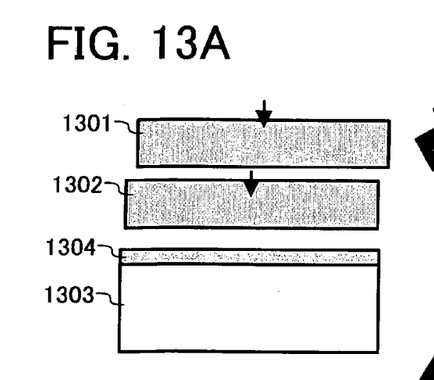
FIG. 13A to FIG. 13E show schematic views for schematically showing a defect (void)-containing photonics crystal and a producing method thereof.
Figure 13B:
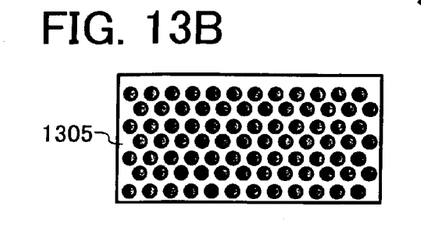
Figure 13C:
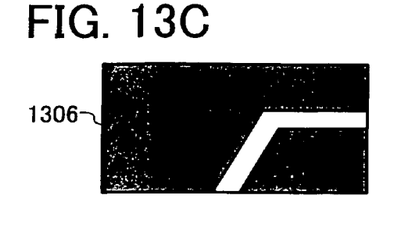
Figure 13D:
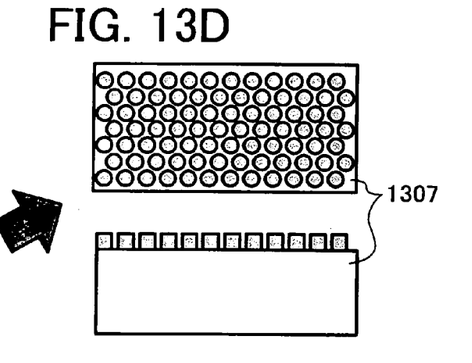
Figure 13E:
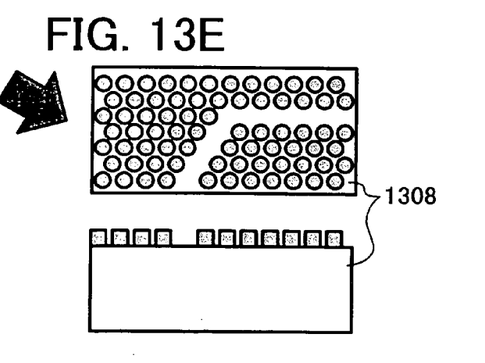

A production of a photonic crystal having a defect as the structural body of this Example will be explained with reference to FIG. 13. An object 1304 to be worked, which is placed on an SiO2 substrate 1303, is worked with a first pulse beam 1301 and a second pulse beam 1302 (FIG. 13A). At this time, the first pulse beam 1302 is passed through a first mask 1305 (FIG. 13B), while the second pulse beam 1302 is passed through a second mask 1306 (FIG. 13C). The first and second pulse beams are shrunk and projected onto a working surface of the object. If the object is irradiated and worked with the first pulse beam only, a two-dimensional photonic crystal 1307 is produced (FIG. 13D). If the object is irradiated and worked with the second pulse beam, a two-dimensional photonic crystal 1308 including a defect waveguide is produced (FIG. 13E). Photonic crystals having various defects can be produced by changing the shape of the second mask 1306.

According to the laser worked structural body in Example 15, high-performance diffraction optical elements such as binary optics as spatially very fine structural bodies can be produced.

As mentioned above, the present invention can provide the ultrashort pulse laser working method capable of producing a variety of fine shapes, particularly three-dimensionally fine shapes, the laser working apparatus embodying said laser working method and the optical elements (structural bodies) having the three-dimensional shapes produced by this working apparatus.

What is claimed is:

1. A laser-working method, which comprising:
   splitting a single pulse laser beam having a time width of not more than 500 picoseconds into plural pulse laser beams;
   subjecting said plural pulse laser beams to time delaying, and adjusting a working surface-irradiating shape, an intensity distribution and a working surface-irradiating position of each of the plural pulse laser beams;
   working a target object to be irradiated, while the respective working surface-irradiating shapes of said plural laser beams are partially or entirely spatially overlapped with each other or one another; and
   setting to a time interval of from a pulse width to 1 nanosecond a time period during which each of the pulse laser beams is irradiated.

2. The laser-working method set forth in claim 1, wherein the intensity of at least one of the plural laser beams is adjustable.

3. The laser-working method set forth in claim 1, where the pulse laser beam is split by using a diffraction optical element.

4. The laser-working method set forth in claim 3, wherein a polarization beam splitter is used as the splitting optical element.

5. The laser-working method set forth in claim 1, wherein the laser beam is split into plural laser beams and the split laser beams are subjected to time delaying by using a birefringent material as a splitting/delaying optical system.

6. The laser-working method set forth in claim 1, wherein the pulse laser beam is spatially split into the plural laser beams.

7. The laser-working method set forth in claim 1, wherein the worked shape is controlled by projecting at least one of the plural pulse laser beams in a reduced size through a mask.

8. The laser-working method set forth in claim 1, wherein the worked shape is controlled by modulating the intensity of at least one of the plural pulse laser beams by a spatial intensity modulator.

9. The laser-working method set forth in claim 1, wherein the worked shape is controlled by modulating a spatial phase of at least one of the plural pulse laser beams.

10. The laser-working method set forth in claim 1, wherein a material exhibiting transparency for the laser beams and a different refractory factor to air is used as a delaying optical system.

11. The laser-working method set forth in claim 1, wherein an electro-optic element is used as the delaying optical system.

12. The laser-working method set forth in claim 1, wherein a material exhibiting transparency to the laser beam is used as the object to be worked.

13. The laser-working method set forth in claim 1, wherein a thin film or a laminated film unit is used as the object to be worked.

14. The laser-working method set forth in claim 2, where the pulse laser beam is split by using a diffraction optical element.

15. The laser-working method set forth in claim 14, wherein a polarization beam splitter is used as the splitting optical element.

16. The laser-working method set forth in claim 2, wherein the laser beam is split into plural laser beams and the split laser beams are subjected to time delaying by using a birefringent material as a splitting/delaying optical system.

17. The laser-working method set forth in claim 2, wherein the pulse laser beam is spatially split into the plural laser beams.

18. The laser-working method set forth in claim 2, wherein the worked shape is controlled by projecting at least one of the plural pulse laser beams in a reduced size through a mask.

19. The laser-working method set forth in claim 2, wherein the worked shape is controlled by modulating the intensity of at least one of the plural pulse laser beams by a spatial intensity modulator.

20. The laser-working method set forth in claim 2, wherein the worked shape is controlled by modulating a spatial phase of at least one of the plural pulse laser beams.

21. The laser-working method set forth in claim 2, wherein a material exhibiting transparency for the laser beams and a different refractory factor to air is used as a delaying optical system.

22. The laser-working method set forth in claim 2, wherein an electro-optic element is used as the delaying optical system.

23. The laser-working method set forth in claim 2, wherein a material exhibiting transparency to the laser beam is used as the object to be worked.

24. The laser-working method set forth in claim 2, wherein a thin film or a laminated film unit is used as the object to be worked.

25. A laser-working apparatus, which comprises:
a splitter for splitting a single pulse laser beam having a time width of not more than 500 picoseconds into plural pulse laser beams;
a time-delayer for subjecting said plural pulse laser beams to time delaying;
a beam shape-rectifying optical system for adjusting a working surface-irradiating shape, an intensity distribution and a working surface-irradiating position of each of the plural pulse laser beams; and
a beam-propagating optical system, wherein a target object to be irradiated is worked with the plural laser beams, while the respective working surface-irradiating shapes of said plural laser beams are partially or entirely spatially overlapped with each other or one another, and a time period during which each of the pulse laser beams is irradiated on a working surface of the object is set to a time interval of from a width of a pulse to nanosecond.

26. The laser-working apparatus set forth in claim 25, which further comprises a laser beam intensity adjuster for adjusting the intensity of at least one of the plural laser beams is adjustable.

27. The laser-working apparatus set forth in claim 25, which further comprises a diffraction optical element for splitting the pulse laser beam.

28. The laser-working apparatus set forth in claim 27, which comprises a polarization beam splitter as the splitting optical element.

29. The laser-working apparatus set forth in claim 25, which comprises a birefringent material as the splitting/delaying optical system for splitting the laser beam into plural laser beams and subjecting the split laser beams to time delaying.

30. The laser-working apparatus set forth in claim 25, which further comprises an optical system for spatially splitting the pulse laser beam into the plural laser beams.

31. The laser-working apparatus set forth in claim 25, which further comprises a mask through which at least one of the plural pulse laser beams projected in a reduced size, thereby controlling the worked shape.

32. The laser-working apparatus set forth in claim 25, which further comprises a spatial intensity modulator for modulating the intensity of at least one of the plural pulse laser beams, thereby controlling the worked shape.

33. The laser-working apparatus set forth in claim 25, which further comprises a spatial phase modulator for by modulating a spatial phase of at least one of the plural pulse laser beams, thereby controlling the worked shape.

34. The laser-working apparatus set forth in claim 25, wherein a material exhibiting transparency for the laser beams and a different refractory factor to air is used as the delaying optical system.

35. The laser-working apparatus set forth in claim 25, wherein an electro-optic element is used as the delaying optical system.

36. An optical element produced by the laser-working method set forth in claim 1.

37. An optical element produced by the laser-working apparatus set forth in claim 25.

* * * * *